United States Patent
Kasahara et al.

(10) Patent No.: US 9,859,674 B2
(45) Date of Patent: Jan. 2, 2018

(54) LASER OSCILLATION COOLING DEVICE

(71) Applicant: MITSUBISHI HEAVY INDUSTRIES, LTD., Tokyo (JP)

(72) Inventors: Jiro Kasahara, Tokyo (JP); Naoki Inoue, Tokyo (JP); Koichi Hamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/507,025

(22) PCT Filed: Sep. 25, 2015

(86) PCT No.: PCT/JP2015/077091
§ 371 (c)(1),
(2) Date: Feb. 27, 2017

(87) PCT Pub. No.: WO2016/052327
PCT Pub. Date: Apr. 7, 2016

(65) Prior Publication Data
US 2017/0279244 A1    Sep. 28, 2017

(30) Foreign Application Priority Data
Sep. 29, 2014 (JP) .................. 2014-198225

(51) Int. Cl.
*H01S 3/04* (2006.01)
*H01S 3/042* (2006.01)
(Continued)

(52) U.S. Cl.
CPC ............. *H01S 3/0407* (2013.01); *H01S 3/04* (2013.01); *H01S 3/042* (2013.01); *H01S 3/1306* (2013.01);
(Continued)

(58) Field of Classification Search
CPC .......... H01S 3/0407; H01S 3/042; H01S 3/04; H01S 3/16; H01S 3/1648; H01S 3/1636; H01S 3/1306
See application file for complete search history.

(56) References Cited

U.S. PATENT DOCUMENTS

| 4,296,610 A | 10/1981 | Davis |
| 4,716,738 A | 1/1988 | Tatge et al. |

(Continued)

FOREIGN PATENT DOCUMENTS

| EP | 2 282 058 | 2/2011 |
| JP | 9-297061 | 11/1997 |

(Continued)

OTHER PUBLICATIONS

International Search Report dated Dec. 1, 2015 in corresponding International Application No. PCT/JP2015/077091.
Written Opinion of the International Searching Authority dated Dec. 1, 2015 in corresponding International Application No. PCT/JP2015/077091.

*Primary Examiner* — Kinam Park
(74) *Attorney, Agent, or Firm* — Wenderoth, Lind & Ponack, L.L.P.

(57) ABSTRACT

A laser oscillation cooling device (100) is provided with a light emitting section (1) that emits laser excitation light (Z1), a laser excitation section (2) that excites the laser excitation light (Z1) to emit laser light (Z2) and locally generates heat, a storage tank (3) capable of storing an extremely low temperature liquid (L), a pressurizing section (31) that brings extremely low temperature liquid (L) into a sub-cool state by pressurizing the inside of the storage tank (3), and a jetting supply section (4) that removes heat from the laser excitation section (2) by jetting the extremely low temperature liquid (L) in the sub-cool state to the laser excitation section (2).

6 Claims, 7 Drawing Sheets

(51) Int. Cl.
*H01S 3/13* (2006.01)
*H01S 3/16* (2006.01)

(52) U.S. Cl.
CPC ............... *H01S 3/16* (2013.01); *H01S 3/1636* (2013.01); *H01S 3/1643* (2013.01)

(56) References Cited

U.S. PATENT DOCUMENTS

| | | | | |
|---|---|---|---|---|
| 5,982,792 | A * | 11/1999 | Kasamatsu | ............. H01S 3/042 372/34 |
| 6,195,372 | B1 * | 2/2001 | Brown | .................... H01S 3/042 372/34 |
| 6,240,111 | B1 * | 5/2001 | Kubota | ..................... G02F 1/37 372/20 |
| 6,563,852 | B1 * | 5/2003 | Baillargeon | ........... B82Y 20/00 372/18 |
| 7,532,652 | B2 * | 5/2009 | Vetrovec | ............... F41H 13/005 372/34 |
| 2007/0278719 | A1 | 12/2007 | Adachi et al. | |
| 2014/0169393 | A1 | 6/2014 | Thyzel et al. | |

FOREIGN PATENT DOCUMENTS

| | | |
|---|---|---|
| JP | 10-294520 | 11/1998 |
| JP | 11-295772 | 10/1999 |
| JP | 2001-320136 | 11/2001 |
| JP | 2003-258338 | 9/2003 |

\* cited by examiner

LASER OSCILLATION COOLING DEVICE

TECHNICAL FIELD

The present invention relates to a laser oscillation cooling device.

This application claims the benefit of priority based on Japanese Patent Application No. 2014-198225, filed Sep. 29, 2014, the content of which is incorporated herein by reference.

BACKGROUND ART

In an apparatus, such as a laser machining apparatus, a solid-state laser which is represented by a semiconductor excitation solid-state laser is used as a light source. That is, laser oscillation is caused by exciting a solid-state laser medium through light reflection, thereby obtaining a laser light.

In the oscillation medium (medium) which oscillates laser in this way, it is known that the temperature of the medium increases with an increase in laser output. Furthermore, it is known that, when the medium is cooled, a laser oscillation limit is improved. Accordingly, cooling of the laser oscillation medium is required.

As a technique for cooling the laser oscillation medium, for example, a technique described in PTL 1 is known.

PTL 1 describes a laser light generation device. In this device, in order to remove heat generated from a laser excitation device (BBO crystal device) with the generation of laser light, a configuration in which a cryogen, such as liquid nitrogen, accumulated in a heat insulation container is supplied to a cold finger thermally connected to the BBO crystal device is employed.

CITATION LIST

Patent Literature

[PTL 1] Japanese Unexamined Patent Application Publication No. 11-295772

SUMMARY OF INVENTION

Technical Problem

However, since the laser oscillation limit is substantially proportional to a cooling amount of the laser excitation device as the medium, in a case where the technique described in PTL 1 described above is used, if a laser output equal to or greater than a certain threshold value is attempted to be obtained, there is a possibility that cooling ability of the liquid nitrogen is insufficient. In particular, in the technique of PTL 1, the temperature of the liquid nitrogen increases to cause film boiling, and there is a possibility that cooling ability is not sufficiently obtained. In a case where cooling is not sufficient, the temperature of the medium increases and laser oscillation efficiency is degraded.

The invention has been accomplished in consideration of such a situation, and an object of the invention is to provide a laser oscillation cooling device having a sufficient cooling effect.

Solution to Problem

In order to solve the above-described problem, the invention employs the following means.

That is, according to a first aspect of the invention, a laser oscillation cooling device includes a light emitting section that emits laser excitation light, a laser excitation section that excites the laser excitation light to emit laser light and locally generates heat, a storage tank capable of storing an extremely low temperature liquid, a pressurizing section that brings the extremely low temperature liquid into a sub-cool state by pressurizing the inside of the storage tank, and a jetting supply section that removes heat from the laser excitation section by jetting the extremely low temperature liquid in the sub-cool state to the laser excitation section.

According to the configuration described above, it is possible to bring the extremely low temperature liquid stored in the storage tank into the sub-cool state through pressurization by the pressurizing section. The extremely low temperature liquid of the sub-cool state is jetted to the laser excitation section, whereby it is possible to efficiently remove heat from the laser excitation section.

According to a second aspect of the invention, the laser oscillation cooling device according to the first aspect of the invention may further include a pressure regulating section that changes a sub-cool degree of the extremely low temperature liquid by regulating pressurizing force of the pressurizing section.

According to the configuration described above, the pressure regulating section regulates the pressurizing force of the pressurizing section to change the sub-cool degree of the extremely low temperature liquid, whereby it is possible to obtain desired cooling ability.

According to a third aspect of the invention, the laser oscillation cooling device according to the first or second aspect of the invention may further include a flow rate regulating section that changes the amount of heat removed from the laser excitation section by regulating the flow rate of the extremely low temperature liquid jetted from the jetting supply section.

According to the configuration described above, it is possible to regulate the flow rate of the extremely low temperature liquid by the flow rate regulating section. With this, it is possible to regulate the amount of heat removed from the laser excitation section.

According to a fourth aspect of the invention, the laser oscillation cooling device according to the third aspect of the invention may further include an output measurement section that is provided in the light emitting section to measure an output of the laser excitation light, and a control section that controls the flow rate regulating section based on an output value measured by the output measurement section and regulates the flow rate of the extremely low temperature liquid.

According to the configuration described above, it is possible to regulate the flow rate of the extremely low temperature liquid based on the output of the laser excitation light measured by the output measurement section. With this, it is possible to autonomously and appropriately regulate the amount of heat removed from the laser excitation section.

According to a fifth aspect of the invention, the laser oscillation cooling device according to the third aspect of the invention may further include a temperature measurement section that measures the temperature of the laser excitation section, and a control section that regulates the flow rate of the extremely low temperature liquid by controlling the flow rate regulating section based on the temperature measured by the temperature measurement section.

According to the configuration described above, it is possible to regulate the flow rate of the extremely low temperature liquid based on the temperature of the laser excitation section measured by the temperature measurement section. With this, it is possible to autonomously and appropriately regulate the amount of heat removed from the laser excitation section.

According to a sixth aspect of the invention, in the laser oscillation cooling device according to any one of the first to fifth aspects of the invention, at least a part of the laser excitation section may be provided so as to be exposed to the inside of a cryostat whose inside is maintained at cool temperature.

According to the configuration described above, at least a part of the laser excitation section can be cooled by a cool temperature inside the cryostat. With this, it is possible to further improve the amount of heat removed from the laser excitation section.

Advantageous Effects of Invention

According to the above-described laser oscillation cooling device, it is possible to obtain a sufficient cooling effect, and to appropriately collect and reuse a cooling medium.

DESCRIPTION OF EMBODIMENTS

First Embodiment

Hereinafter, a first embodiment of the invention will be described referring to the drawings.

Figure 1:
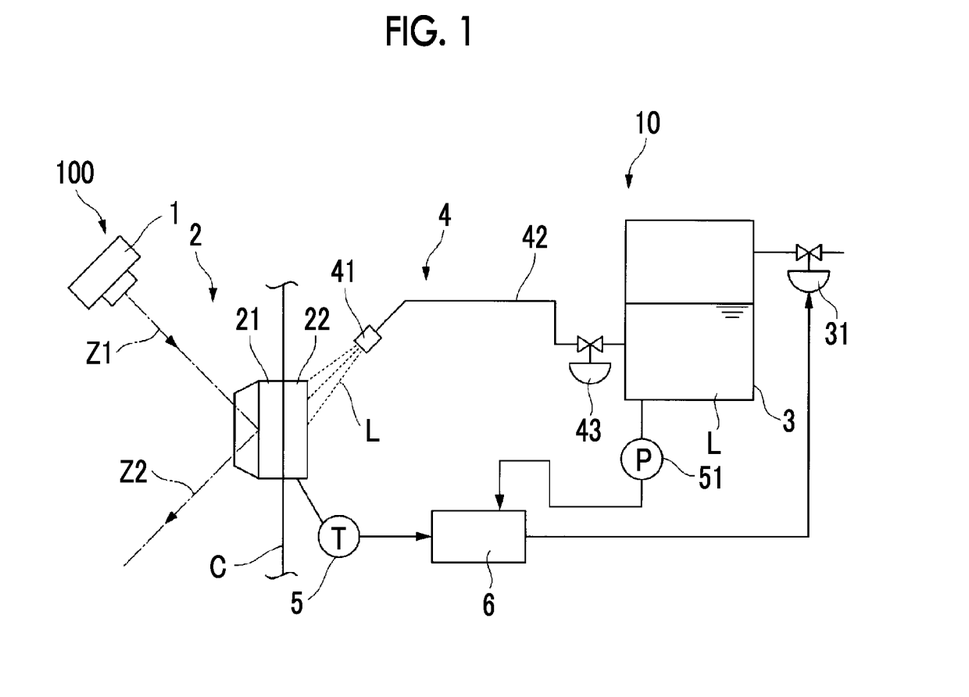
FIG. 1 is a schematic view showing a laser oscillation cooling device according to a first embodiment of the invention.

As shown in FIG. 1, a laser oscillation cooling device 100 according to this embodiment is provided with a light emitting section 1 that emits laser excitation light Z1, a laser excitation section 2 that excites the incident laser excitation light Z1 to emit laser light Z2, a cooling section 10 that cools the laser excitation section 2, and a control section 6 that controls the operation of the cooling section 10.

(Laser Excitation Section)

The light emitting section 1 is provided at a position where the laser excitation section 2 can be irradiated with the laser excitation light Z1. The laser excitation section 2 has a medium section 21 that has, for example, sapphire or yttrium aluminum garnet (YAG) crystal, and a heat sink section 22 thermally connected to the medium section 21.

About several tens of % of the laser excitation light Z1 incident on the medium section 21 in the laser excitation section 2 are excited by a laser excitation medium and become the laser light Z2. The laser light Z2 is extracted to the outside and used, for example, for laser machining or the like.

While the laser light Z2 is obtained by the medium section 21 of the laser excitation section 2, components excluding the components extracted as the laser light Z2 are substantially converted to heat. Due to this heat, the laser excitation section 2 locally generates heat. As described above, since the heat sink section 22 is thermally connected to the medium section 21, heat generated in the medium section 21 is immediately transferred to the heat sink section 22.

In addition, the laser excitation section 2 is provided with a temperature measurement section 5. The temperature measurement section 5 is a device that measures and numeralizes the temperature of the medium section 21 in the laser excitation section 2. As the temperature measurement section 5, for example, a temperature sensor or the like is used.

The laser excitation section 2 configured as above is provided such that at least a part (heat sink section 22) is exposed to the inside of a cryostat C. The inside of the cryostat C is maintained at cool temperature.

(Cooling Section)

The lower the temperature of the laser excitation medium, the higher an oscillation limit (maximum output: W) of laser excited by the laser excitation section 2. Accordingly, in order to cool the laser excitation section 2, the laser oscillation cooling device 100 according to this embodiment is provided with the cooling section 10. The cooling section 10 is a device that cools the laser excitation section 2 using an extremely low temperature liquid L. The cooling section 10 is provided with a storage tank 3 capable of storing the extremely low temperature liquid L, a pressurizing section 31 that pressurizes the inside of the storage tank 3, and a jetting supply section 4 that extracts the extremely low temperature liquid L in the storage tank 3 and supplies the extremely low temperature liquid L to the laser excitation section 2.

In this embodiment, an example where liquid nitrogen is used as the extremely low temperature liquid L is described. The storage tank 3 is a container capable of stably storing liquid nitrogen in a liquid-phase state. That is, the inside of the storage tank 3 is maintained at extremely low temperature. The pressure inside the storage tank 3 can be regulated by the pressurizing section 31. As the pressurizing section 31, a pressure valve connected to an external pressure supply source (not shown) is suitably used. In addition, the storage tank 3 is provided with a pressure measurement section 51 that measures the pressure inside thereof. As an example of the pressure measurement section 51, a pressure gauge, a pressure sensor, or the like capable of outputting a pressure value to the outside as an electric signal is exemplified.

Since the volume of the storage tank 3 is constant, the pressure inside the storage tank 3 is increased by the pressurizing section 31, thereby decreasing the temperature of the extremely low temperature liquid L. On the contrary, the pressure inside the storage tank 3 is decreased, thereby increasing the temperature of the extremely low temperature liquid L.

In particular, in the cooling section 10 according to this embodiment, the pressure inside the storage tank 3 is continued to be decreased by the pressurizing section 31, thereby maintaining the extremely low temperature liquid L inside the storage tank 3 in a sub-cool state. For example, in a case where liquid nitrogen is used as the extremely low temperature liquid L, a saturation temperature of liquid nitrogen under atmospheric pressure is −196° C.; however, in a case where the extremely low temperature liquid L is in the sub-cool state, it is possible to maintain the saturation temperature at a value lower than −196° C. The pressure inside the storage tank 3 is regulated by the pressurizing section 31, thereby regulating a sub-cool degree of the extremely low temperature liquid L in the sub-cool state, that is, the difference from the saturation temperature.

The jetting supply section 4 is a device that jets the extremely low temperature liquid L to the laser excitation section 2. The jetting supply section 4 is provided with a jet nozzle 41 that jets the extremely low temperature liquid L, a supply pipe 42 that connects the jet nozzle 41 and the storage tank 3, and a flow rate regulating section 43 provided in the middle of the supply pipe 42.

In a tip portion of the jet nozzle 41, a plurality of jet holes are formed. The extremely low temperature liquid L supplied from the storage tank 3 to the jet nozzle 41 through the supply pipe 42 is jetted toward the outside through the jet holes in a spray shape. The flow rate of the extremely low temperature liquid L jetted from the jet nozzle 41 can be regulated by the flow rate regulating section 43. As the flow rate regulating section 43, for example, a valve, such as a throttle valve or a flow rate regulator valve, capable of regulating an opening is suitably used.

(Control Section)

Figure 2:
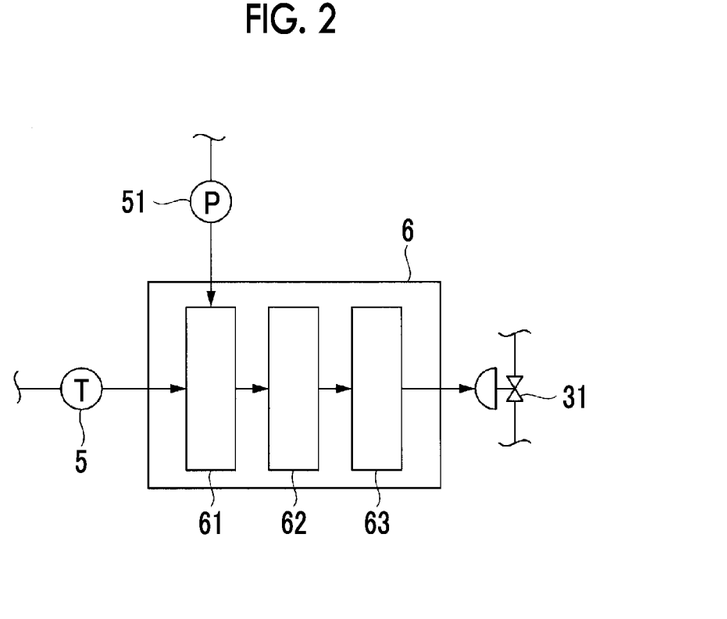
FIG. 2 is a schematic view showing the configuration of a control section according to the first embodiment of the invention.

The control section 6 is a device that regulates the sub-cool degree of the extremely low temperature liquid L according to the temperature of the laser excitation section 2 and obtaining an optimum cooling effect. The control section 6 has an input storage section 61 that receives various measurement values as electric signals from the outside as input and stores data to be compared with the measurement values, a calculation section 62 that performs calculation based on input values input to the input storage section 61, and an instruction section 63 that outputs an instruction value to the outside based on the calculation value output from the calculation section 62.

The sub-cool degree of the extremely low temperature liquid L can be changed by regulating the pressure inside the storage tank 3. For example, in a case where the pressure inside the storage tank 3 is increased, it is possible to increase the sub-cool degree of the extremely low temperature liquid L. In a case where the pressure inside the storage tank 3 is decreased, it is possible to decrease the sub-cool degree of the extremely low temperature liquid L.

Figure 10:
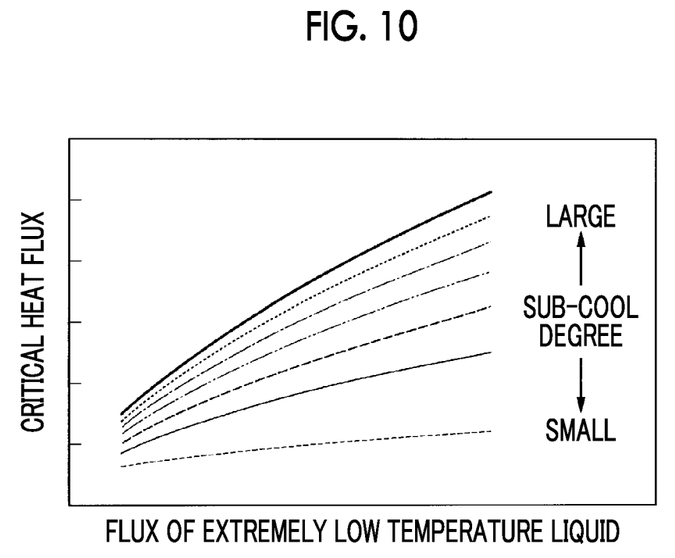
FIG. 10 is a graph showing the relationship between a flux and a critical heat flux in a case where a sub-cool degree of an extremely low temperature liquid is changed.

In addition, as shown in FIG. 10, the higher the sub-cool degree of the extremely low temperature liquid L for cooling the laser excitation section 2, the larger a critical heat flux of the extremely low temperature liquid L. That is, the higher the sub-cool degree, the further a laser oscillation limit value in the laser excitation section 2 is improved. Accordingly, in a case where a laser output having a certain value is obtained, there is a minimum sub-cool degree (target sub-cool degree) required for maintaining the laser output.

In the control section 6 according to this embodiment, the calculation section 62 calculates the required target sub-cool degree based on the laser output measured as a temperature value, the instruction section 63 sends an instruction signal to the pressurizing section 31 for the target sub-cool degree, and the pressure inside the storage tank 3 is regulated. That is, in this case, the control section 6 is operated as a pressure regulating section 6 by regulating a pressurizing force of the pressurizing section 31.

Next, an example of the detailed configuration and operation of the control section 6 will be described referring to FIGS. 2 and 3.

The input storage section 61 is connected to the temperature measurement section 5 provided in the laser excitation section 2 described above and the pressure measurement section 51 provided in the storage tank 3 by signal lines, respectively. With this, the temperature value output from the temperature measurement section 5 and the pressure value output from the pressure measurement section 51 are input to the input storage section 61.

In addition, the input storage section 61 stores a table (table A1) representing the relationship between the temperature value of the laser excitation section 2 and the sub-cool degree (target sub-cool degree) of the extremely low temperature liquid L required under a situation of the temperature value. In addition to the table A1, the input storage section 61 stores a table (table A2) representing the relationship between the pressure inside the storage tank 3 and the sub-cool degree of the extremely low temperature liquid L. The table A1 and the table A2 are determined empirically in consideration of conditions, such as the configuration of an apparatus or an environment in which the apparatus is operated.

Figure 3:
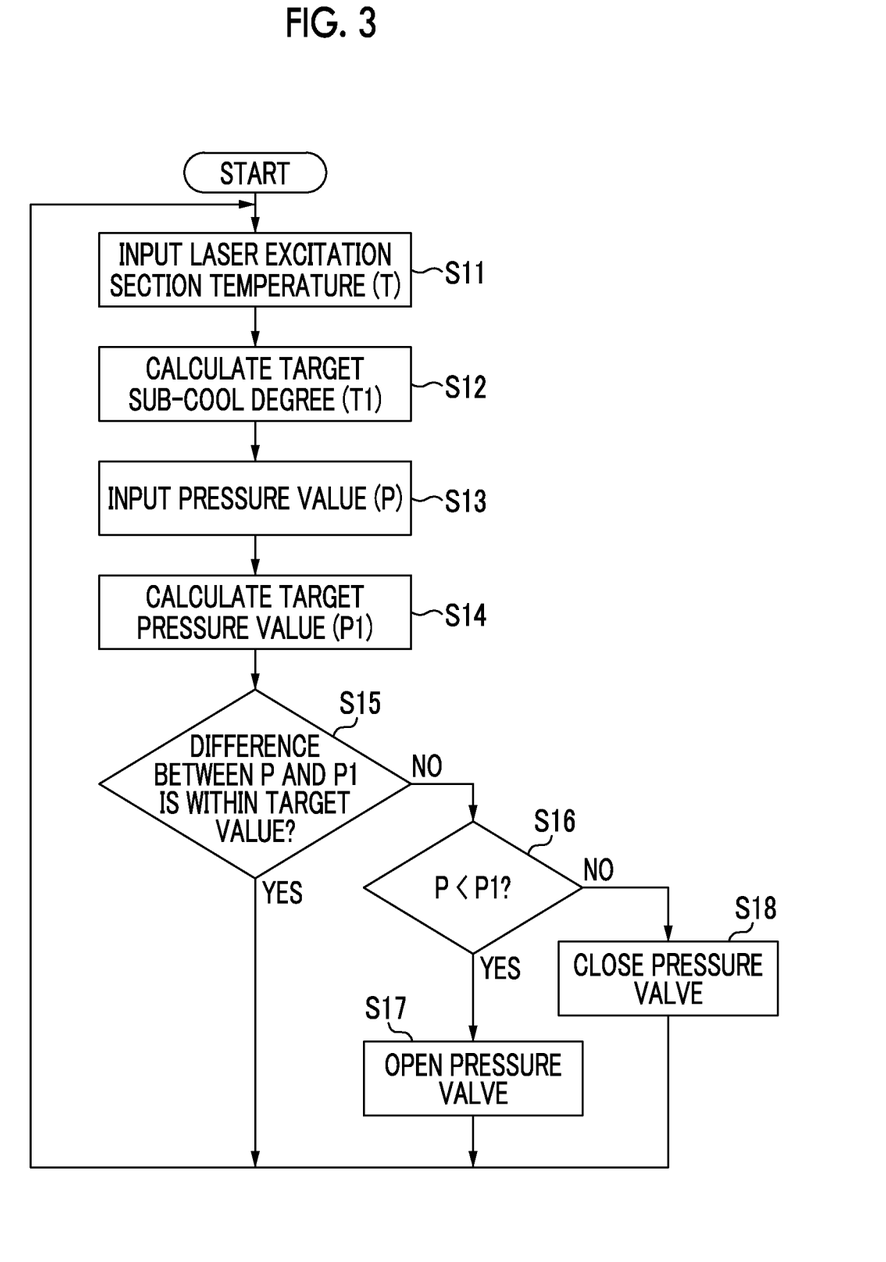
FIG. 3 is a flowchart showing an example of the operation of the control section according to the first embodiment of the invention.

Specifically, as shown in FIG. 3, first, a temperature value T of the laser excitation section 2 is input to the input storage section 61 (Step S11). A target sub-cool degree T1 is obtained from the above-described table A1 based on the temperature value T (Step S12). Subsequently, a pressure value P inside the storage tank 3 is input to the input storage section 61 (Step S13). Next, a target pressure value P1 is obtained from the above-described table A2 based on the above-described target sub-cool degree T1 (Step S14).

Then, the pressure value P obtained in the above-described manner and the target pressure value P1 are input to the calculation section 62. The calculation section 62 determines whether or not the difference between the pressure value P and the target pressure value P1 is equal to or less than a target value determined in advance (Step S15).

In a case where it is determined that the difference between the pressure value P and the target pressure value P1 is equal to or less than the target value, it can be considered that the sub-cool degree of the extremely low temperature liquid L is maintained at a proper value.

Meanwhile, in a case where it is determined that the difference between the pressure value P and the target pressure value P1 is not equal to or less than the target value determined in advance, it can be considered that the sub-cool degree of the extremely low temperature liquid L is not proper. That is, there is a need for correcting this situation.

In order to make the difference between the pressure value P and the target pressure value P1 equal to or less than the target value, transition is performed to next Step S16. In Step S16, first, the magnitude relationship between the pressure value P and the target pressure value P1 is determined. In FIG. 3, an example where it is determined whether or not the pressure value P is smaller than the target pressure value P1 (P<P1) is shown.

In Step S16, in a case where it is determined that the pressure value P is smaller than the target pressure value P1, in order to increase the pressure value P, an instruction signal is sent from the instruction section 63 to the pressurizing section 31. Specifically, an instruction to increase the opening of the pressurizing section 31 (pressure valve) and an increase width of the opening are sent as the instruction signal.

Meanwhile, in Step S16, in a case where it is determined that the pressure value P is larger than the target pressure value P1, in order to decrease the pressure value P, an instruction signal is sent from the instruction section 63 to the pressurizing section 31. Specifically, an instruction to decrease the opening of the pressurizing section 31 (pressure valve) and a decrease width of the opening are sent as the instruction signal.

In a case where a pressure release valve or the like for releasing a pressure is provided in the storage tank 3, a configuration in which opening information of the valve is sent to the pressure release valve may be made.

According to the configuration described above, it is possible to bring the extremely low temperature liquid L stored in the storage tank 3 into the sub-cool state through pressurization by the pressurizing section 31. The extremely low temperature liquid L in the sub-cool state is jetted to the laser excitation section 2, whereby it is possible to efficiently remove (cool) heat from the laser excitation section 2. In addition, since the extremely low temperature liquid in the sub-cool state is an initial state of nucleate boiling, film boiling is not caused. With this, it is possible to persistently obtain a sufficient cooling effect.

According to the configuration described above, the control section 6 (pressure regulating section 6) regulates the pressurizing force of the pressurizing section 31, thereby changing the sub-cool degree of the extremely low temperature liquid L. With this, it is possible to perform appropriate cooling on the laser excitation section 2 according to the output of the laser light Z2 in the laser excitation section 2.

According to the configuration described above, it is possible to persistently cool at least a part (heat sink section 22) of the laser excitation section 2 inside the cryostat C maintained at cool temperature. With this, it is possible to further improve the amount of heat removed from the laser excitation section 2.

Second Embodiment

Subsequently, a second embodiment of the invention will be described referring to FIGS. 4 to 6. The same configurations as those in the first embodiment are represented by the same reference numerals, and detailed description thereof will not be repeated.

Figure 4:
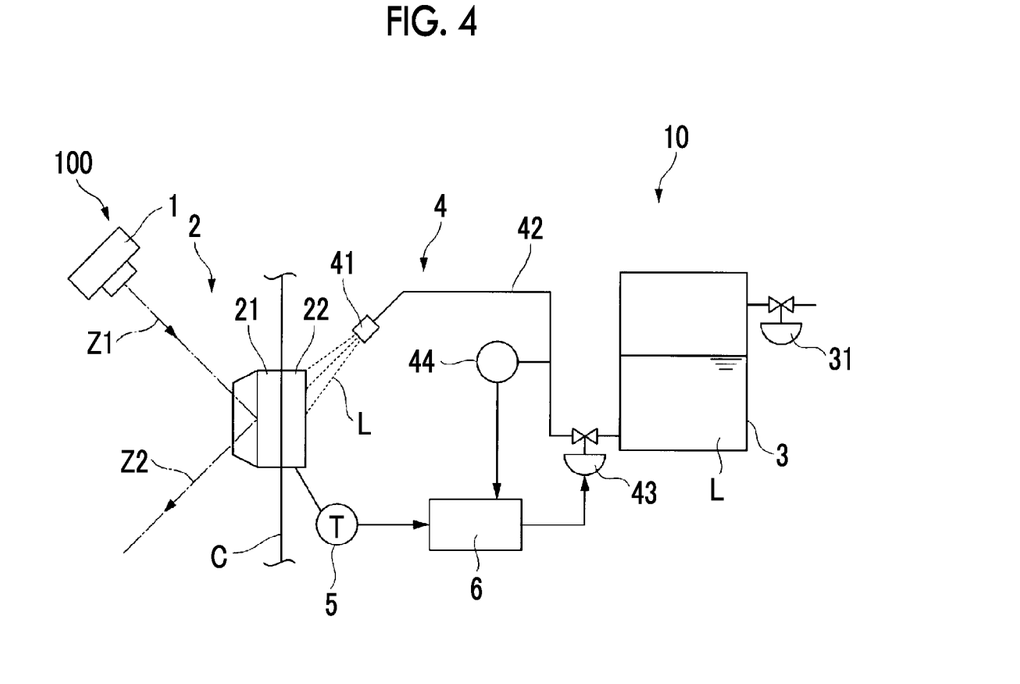
FIG. 4 is a schematic view showing a laser oscillation cooling device according to a second embodiment of the invention.

As shown in FIG. 4, in a laser oscillation cooling device 100 according to this embodiment, a flow rate regulating section 43 that regulates the flow rate of the extremely low temperature liquid L is provided on the supply pipe 42 through which the extremely low temperature liquid L flows. As the flow rate regulating section 43, an electromagnetic valve or the like capable of adjusting an opening based on an electric signal from the outside is suitably used. On a downstream side of the flow rate regulating section 43, a flow rate measurement section 44 is provided. The flow rate measurement section 44 measures the flow rate of the extremely low temperature liquid L flowing through the supply pipe 42, numeralizes the flow rate as a flow rate value F, and outputs the flow rate value F to the outside as an electric signal.

In a laser excitation section 2 according to this embodiment, as in the first embodiment, a temperature measurement section 5 that measures the temperature of the medium section 21 is provided.

Figure 5:
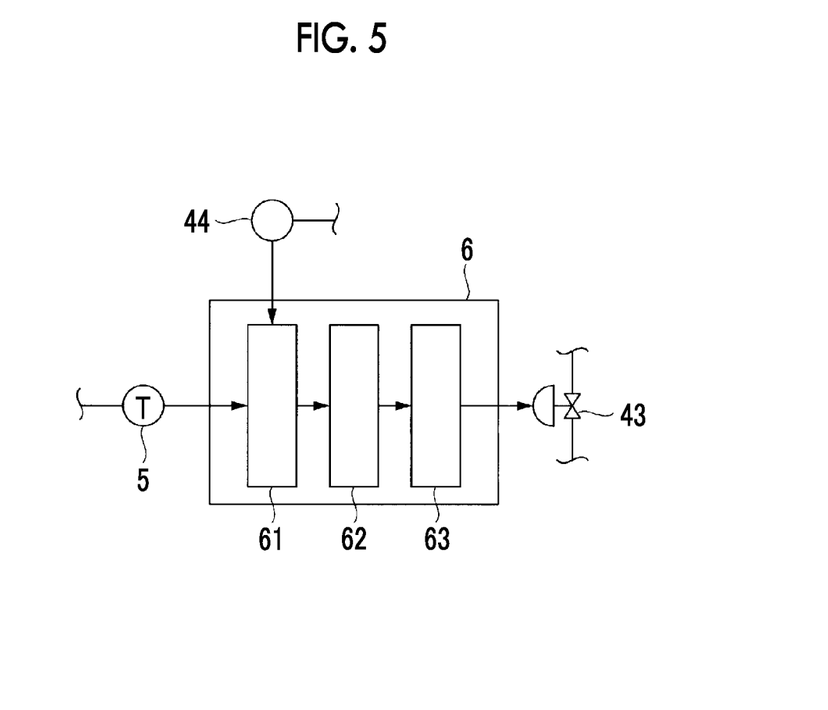
FIG. 5 is a schematic view showing the configuration of a control section according to the second embodiment of the invention.

The flow rate regulating section 43, the flow rate measurement section 44, and the temperature measurement section 5 are electrically connected to the control section 6 (FIG. 5). Specifically, the flow rate regulating section 43 is configured to receive a signal from the instruction section 63 in the control section 6. The flow rate measurement section 44 and the temperature measurement section 5 respectively input the flow rate value and the temperature value as measurement results to the input storage section 61 in the control section 6.

Figure 11:
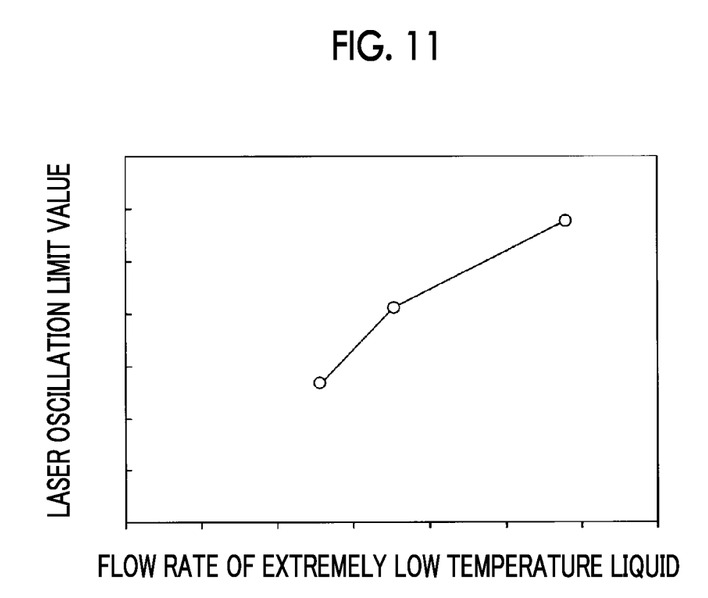
FIG. 11 is a graph showing the relationship between a flow rate of the extremely low temperature liquid and a laser oscillation limit value.

The flow rate of the extremely low temperature liquid L and the amount of heat (laser oscillation limit value) removed from the laser excitation section 2 are substantially in a proportional relationship as shown in FIG. 11. That is, the higher the flow rate of the extremely low temperature liquid L jetted from the jet nozzle 41 of the jetting supply section 4, the further the amount of heat removed from the laser excitation section 2 can be improved.

An example of the configuration and operation of the control section 6 will be described referring to FIGS. 5 and 6.

In the laser oscillation cooling device 100 according to this embodiment, the control section 6 calculates a proper target flow rate value F1 of the extremely low temperature liquid L based on the temperature value T of the laser excitation section 2 measured by the temperature measurement section 5, and then, sends an instruction signal corresponding to the target flow rate value F1 to the flow rate regulating section 43.

The input storage section 61 is connected to the temperature measurement section 5 provided in the laser excitation section 2 described above and the flow rate measurement section 44 provided on the supply pipe 42 by signal lines, respectively. With this, the temperature value output from the temperature measurement section 5 and the flow rate value output from the flow rate measurement section 44 are input to the input storage section 61.

The input storage section 61 stores a table (table A3) representing the relationship between the temperature value of the laser excitation section 2 and the flow rate of the extremely low temperature liquid L required under a situation of the temperature value. In addition to the table A3, the input storage section 61 stores a table (table A4) representing the relationship between the flow rate value on the supply pipe 42 and the opening of the flow rate regulating section 43 (flow rate regulator valve). The table A3 and the table A4 are determined empirically in consideration of conditions, such as the configuration of an apparatus or an environment in which the apparatus is operated.

Figure 6:
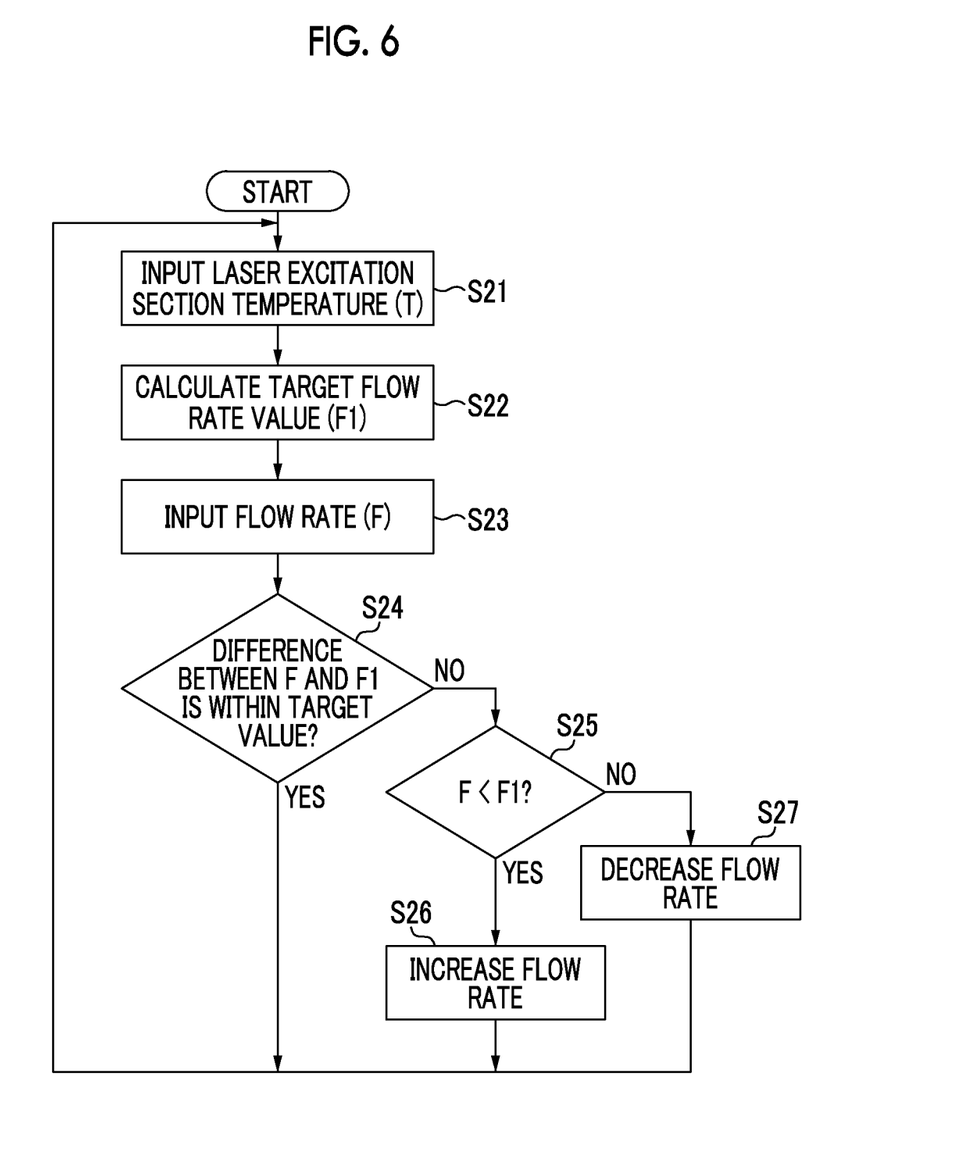
FIG. 6 is a flowchart showing an example of the operation of the control section according to the second embodiment of the invention.

Specifically, as shown in FIG. 6, first, the temperature value T of the laser excitation section 2 is input to the input storage section 61 (Step S21). The target flow rate value F1 is obtained from the above-described table A3 based on the temperature value T (Step S22). Subsequently, the flow rate value F of the extremely low temperature liquid L is input from the flow rate measurement section 44 to the input storage section 61 (Step S23).

Next, the flow rate value F obtained in the above-described manner and the target flow rate value F1 are input to the calculation section 62. The calculation section 62 determines whether or not the difference between the flow rate value F and the target flow rate value F1 is equal to or less than a target value determined in advance (Step S24).

In a case where it is determined that the difference between the flow rate value F and the target flow rate value F1 is equal to or less than the target value, it can be considered that the flow rate of the extremely low temperature liquid L is maintained at a proper value.

In a case where the difference between the flow rate value F and the target flow rate value F1 is not equal to or less than the target value determined in advance, it can be considered that the flow rate of the extremely low temperature liquid L is not proper. That is, there is a need for correcting this situation.

In order to make the difference between the flow rate value F and the target flow rate value F1 equal to or less than the target value, transition is performed to next Step S25. In Step S25, first, the magnitude relationship between the flow rate value F and the target flow rate value F1 is determined. In FIG. 6, an example where it is determined whether or not the flow rate value F is smaller than the target flow rate value F1 (P<P1) is shown.

In Step S25, in a case where it is determined that the flow rate value F is smaller than the target flow rate value F1, in order to increase the flow rate value F, an instruction signal is sent from the instruction section 63 to the flow rate regulating section 43. Specifically, an instruction to increase the opening of the flow rate regulating section 43 (flow rate regulator valve) and an increase width of the opening are sent as the instruction signal.

In Step S25, in a case where it is determined that the flow rate value F is larger than the target flow rate value F1, in order to decrease the flow rate value F, an instruction signal is sent from the instruction section 63 to the flow rate regulating section 43. Specifically, an instruction to decrease the opening of the flow rate regulating section 43 (flow rate regulator valve) and a decrease width of the opening are sent as the instruction signal.

According to the configuration described above, it is possible to regulate the flow rate of the extremely low temperature liquid L based on the temperature of the laser excitation section 2 measured by the temperature measurement section 5. With this, it is possible to autonomously and appropriately regulate the amount of heat removed from the laser excitation section 2.

Third Embodiment

Subsequently, a third embodiment of the invention will be described referring to FIGS. 7 to 9.

Figure 7:
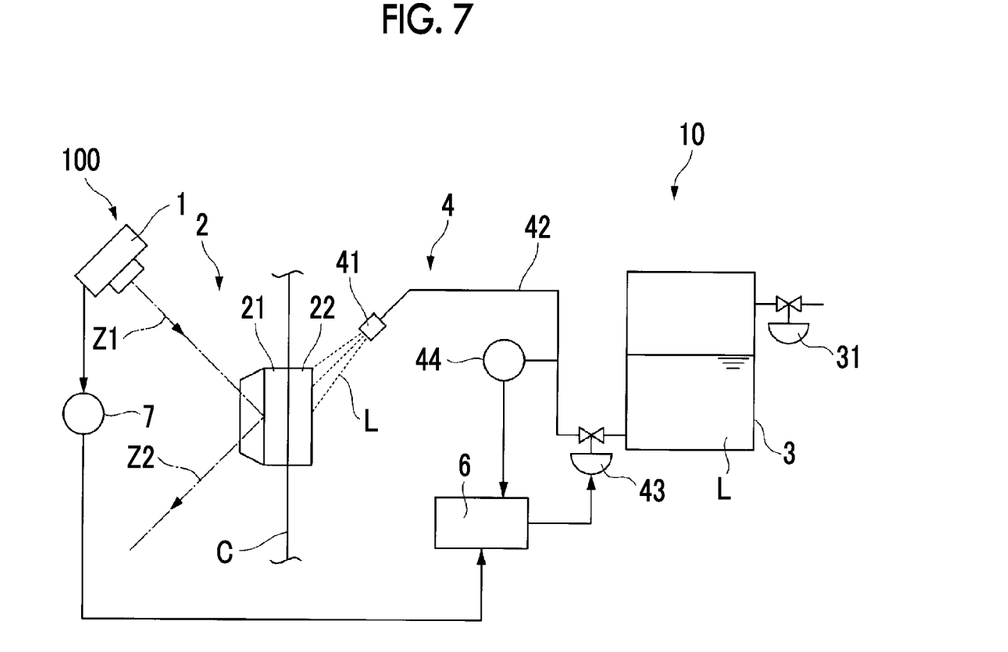
FIG. 7 is a schematic view showing a laser oscillation cooling device according to a third embodiment of the invention.

As shown in FIG. 7, in a laser oscillation cooling device 100 according to this embodiment, as in the above-described second embodiment, a flow rate regulating section 43 that regulates the flow rate of the extremely low temperature liquid L is provided on the supply pipe 42 through which the extremely low temperature liquid L flows. As the flow rate regulating section 43, an electromagnetic valve or the like capable of regulating an opening based on an electric signal from the outside is suitably used. On a downstream side of the flow rate regulating section 43, a flow rate measurement section 44 is provided. The flow rate measurement section 44 measures the flow rate of the extremely low temperature liquid L flowing through the supply pipe 42, numeralizes the flow rate as a flow rate value, and outputs the flow rate value to the outside as an electric signal.

The laser excitation section 2 according to this embodiment is provided with an output measurement section that measures an output value of the light emitting section 1.

Figure 8:
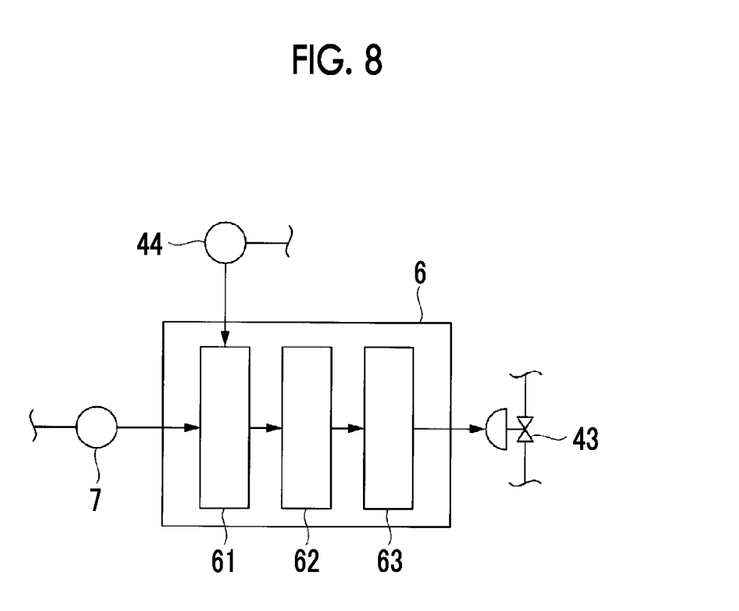
FIG. 8 is a schematic view showing the configuration of a control section according to the third embodiment of the invention.

The flow rate regulating section 43, the flow rate measurement section 44, and the output measurement section 7 are electrically connected to the control section 6 (FIG. 8). Specifically, the flow rate regulating section 43 is configured to receive a signal from the instruction section 63 in the control section 6. The flow rate measurement section 44 and the output measurement section respectively input the flow rate value and the output value as measurement results to the input storage section 61 in the control section 6.

An example of the configuration and operation of the control section 6 will be described referring to FIGS. 8 and 9.

In the laser oscillation cooling device 100 according to this embodiment, the control section 6 calculates a proper target flow rate value F1 of the extremely low temperature liquid L based on an output value P of the light emitting section 1 measured by the output measurement section 7, and sends an instruction signal corresponding to the target flow rate value F1 to the flow rate regulating section 43.

The input storage section 61 is connected to the output measurement section 7 provided in the laser excitation section 2 described above and the flow rate measurement section 44 on the supply pipe 42 by signal lines, respectively. With this, the output value output from the output measurement section 7 and the flow rate value output from the flow rate measurement section 44 are input to the input storage section 61.

The input storage section 61 stores a table (table A5) representing the relationship between the output value of the light emitting section 1 and the flow rate of the extremely low temperature liquid L required under a situation of the output value. In addition to the table A5, the input storage section 61 stores a table (table A6) representing that relationship between the flow rate value on the supply pipe 42 and the opening of the flow rate regulating section 43 (flow rate regulator valve). The table A5 and the table A6 are determined in consideration of conditions, such as the configuration of an apparatus or an environment in which the apparatus is operated.

Figure 9:
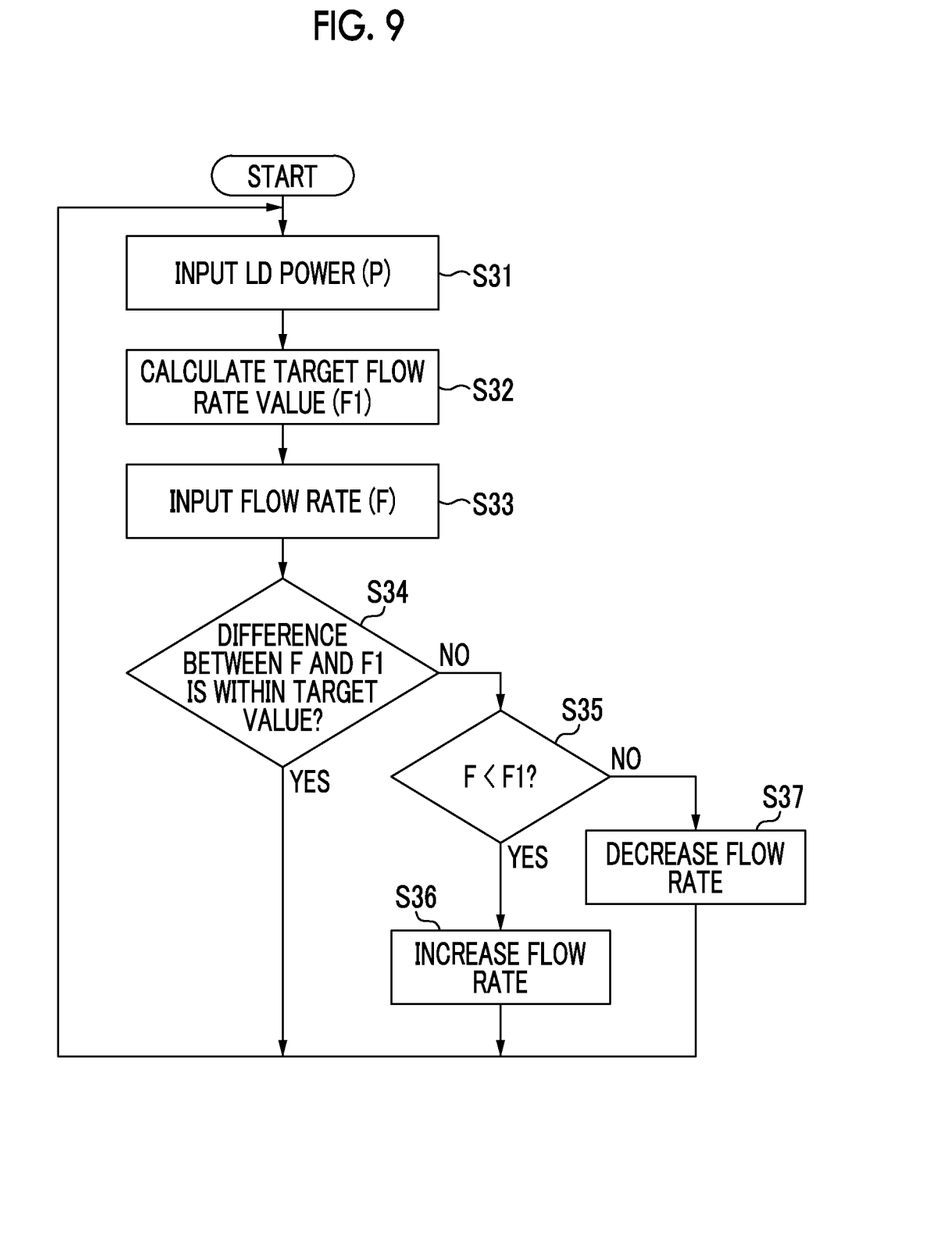
FIG. 9 is a flowchart showing an example of the operation of the control section according to the third embodiment of the invention.

Specifically, as shown in FIG. 9, first, the output value P of the light emitting section 1 is input to the input storage section 61 (Step S31). The target flow rate value F1 is obtained from the above-described table A5 based on the output value P (Step S32). Subsequently, the flow rate value F of the extremely low temperature liquid L is input from the flow rate measurement section 44 to the input storage section 61 (Step S33).

Next, the flow rate value F obtained in the above-described manner and the target flow rate value F1 are input to the calculation section 62. The calculation section 62 determines whether or not the difference between the flow rate value F and the target flow rate value F1 is equal to or less than a target value determined in advance (Step S34).

In a case where it is determined that the difference between the flow rate value F and the target flow rate value F1 is equal to or less than the target value, it can be considered that the flow rate of the extremely low temperature liquid L is maintained at a proper value.

In a case where it is determined that the difference between the flow rate value F and the target flow rate value F1 is not equal to or less than the target value determined in advance, it can be considered that the flow rate of the extremely low temperature liquid L is not proper. That is, there is a need for correcting this situation.

In order to make the difference between the flow rate value F and the target flow rate value F1 equal to or less than the target value, transition is performed to next Step S35. In Step S35, first, the magnitude relationship between the flow rate value F and the target flow rate value F1 is determined. In FIG. 9, an example where it is determined whether or not the flow rate value F is smaller than the target flow rate value F1 (P<P1) is shown.

In Step S35, in a case where it is determined that the flow rate value F is smaller than the target flow rate value F1, in order to increase the flow rate value F, an instruction signal is sent from the instruction section 63 to the flow rate regulating section 43. Specifically, an instruction to increase the opening of the flow rate regulating section 43 (flow rate regulator valve) and an increase width of the opening are sent as the instruction signal (Step S36).

In Step S35, in a case where it is determined that the flow rate value F is larger than the target flow rate value F1, in order to decrease the flow rate value F, an instruction signal is sent from the instruction section 63 to the flow rate regulating section 43. Specifically, an instruction to decrease the opening of the flow rate regulating section 43 (flow rate regulator valve) and a decrease width of the opening are sent as the instruction signal (Step S37).

According to the configuration described above, it is possible to regulate the flow rate of the extremely low temperature liquid L based on the output of the laser excitation light Z1 from the light emitting section 1 measured by the temperature measurement section 5. With this, it is possible to autonomously and appropriately regulate the amount of heat removed from the laser excitation section 2.

Although the embodiments of the invention have been described in detail referring to the drawings, a specific configuration is not limited to the embodiments, and a design change and the like may be included without departing from the scope of the invention.

For example, in the respective embodiments described above, an example where liquid nitrogen is used as the extremely low temperature liquid has been described. However, an aspect of the extremely low temperature liquid is not limited thereto, and for example, any chemical species, such as liquid neon or liquid helium, can be suitably used as long as the chemical species exhibit inactivity in a liquid-phase state.

An example where YAG crystal is applied as the medium section in the laser excitation section has been described. However, an aspect of the laser excitation section is not limited thereto, and any medium can be applied as long as the medium can oscillate laser light and requires active cooling.

In the respective embodiments described above, for the purpose of regulating the amount of heat removed from the laser excitation section 2, a configuration is made in which the sub-cool degree or the flow rate of the extremely low temperature liquid L is changed by the control section 6. However, an aspect of the control of the amount of heat removed from the laser excitation section 2 is not limited thereto. For example, the amount of removed heat can be arbitrarily controlled by changing the angle of the jet nozzle 41 in the jetting supply section 4 with respect to the heat sink section 22, that is, the angle at which the extremely low temperature liquid L is jetted. In a case where such a configuration is employed, an actuator for freely changing the angle of the jet nozzle 41 is provided, and a table in which the relationship between the angle of the jet nozzle 41 and the amount of removed heat is plotted is stored in the control section 6 (input storage section 61), whereby it is possible to obtain the same effects as in the respective embodiments described above.

INDUSTRIAL APPLICABILITY

According to the above-described laser oscillation cooling device, it is possible to obtain a sufficient cooling effect, and to appropriately collect and reuse a cooling medium.

REFERENCE SIGNS LIST

100: laser oscillation cooling device
1: light emitting section
2: laser excitation section
21: medium section
22: heat sink section
3: storage tank
31: pressurizing section
10: cooling section
4: jetting supply section
41: jet nozzle
42: supply pipe
43: flow rate regulating section
44: flow rate measurement section
5: temperature measurement section
51: pressure measurement section
6: control section
61: input storage section
62: calculation section
63: instruction section
7: output measurement section
C: cryostat
L: extremely low temperature liquid
Z1: laser excitation light
Z2: laser light

The invention claimed is:

1. A laser oscillation cooling device comprising:
a light emitting section that emits laser excitation light;
a laser excitation section that excites the laser excitation light to emit laser light and locally generates heat;
a storage tank capable of storing an extremely low temperature liquid;
a pressurizing section that brings the extremely low temperature liquid into a sub-cool state by pressurizing the inside of the storage tank; and
a jetting supply section that removes heat from the laser excitation section by jetting the extremely low temperature liquid in the sub-cool state to the laser excitation section.

2. The laser oscillation cooling device according to claim 1, further comprising:
a pressure regulating section that changes a sub-cool degree of the extremely low temperature liquid by regulating pressurizing force of the pressurizing section.

3. The laser oscillation cooling device according to claim 1, further comprising:
a flow rate regulating section that changes the amount of heat removed from the laser excitation section by regulating the flow rate of the extremely low temperature liquid jetted from the jetting supply section.

4. The laser oscillation cooling device according to claim 3, further comprising:
an output measurement section that is provided in the light emitting section to measure an output of the laser excitation light; and a control section that controls the flow rate regulating section based on an output value measured by the output measurement section and regulates the flow rate of the extremely low temperature liquid.

5. The laser oscillation cooling device according to claim 3, further comprising:
a temperature measurement section that measures the temperature of the laser excitation section; and
a control section that regulates the flow rate of the extremely low temperature liquid by controlling the flow rate regulating section based on the temperature measured by the temperature measurement section.

6. The laser oscillation cooling device according to claim 1,
wherein at least a part of the laser excitation section is provided so as to be exposed to the inside of a cryostat whose inside is maintained at cool temperature.

* * * * *